United States Patent [19]

Trickel et al.

[11] 4,365,743
[45] Dec. 28, 1982

[54] RAILROAD-HIGHWAY CROSSING DECK COMPONENT

[76] Inventors: Lorn L. Trickel, 8806 NE. Thompson, Portland, Oreg. 97220; William H. Stultz, 9424 N. Burr St., Portland, Oreg. 97203

[21] Appl. No.: 245,257

[22] Filed: Mar. 19, 1981

[51] Int. Cl.³ ................ E01B 2/00; E01B 26/00; E01C 9/04
[52] U.S. Cl. ................................ 238/8; 238/382; 404/34; 404/41
[58] Field of Search ................ 238/8, 382; 404/34, 404/41

[56] References Cited

U.S. PATENT DOCUMENTS

| | | | |
|---|---|---|---|
| 1,116,421 | 11/1914 | Wallace et al. | 238/8 |
| 1,689,300 | 10/1928 | Rogers | 238/8 |
| 1,710,030 | 4/1929 | Pearson et al. | 238/8 |
| 3,465,963 | 9/1969 | Caillet et al. | 238/8 X |
| 3,469,783 | 9/1969 | Uralli et al. | 238/8 |
| 3,894,686 | 7/1975 | Weinberg et al. | 238/8 |
| 4,009,827 | 3/1977 | Tafel | 238/8 |
| 4,093,120 | 6/1978 | Canfield | 238/8 |
| 4,147,304 | 4/1979 | Blyton | 238/8 |
| 4,203,547 | 5/1980 | Van der Harst | 238/8 |

FOREIGN PATENT DOCUMENTS

| | | | |
|---|---|---|---|
| 181286 | 8/1954 | Austria | 238/8 |
| 581848 | 8/1959 | Canada | 238/8 |
| 2350759 | 4/1975 | Fed. Rep. of Germany | 238/8 |

OTHER PUBLICATIONS

Popular Mechanics, Jan. 19, 1960, p. 60.
Railway Track and Structures, May 1976, pp. 37-38, May 1977, pp. 26-27.

*Primary Examiner*—Robert B. Reeves
*Assistant Examiner*—Howard Beltran
*Attorney, Agent, or Firm*—Eugene D. Farley

[57] ABSTRACT

A deck component for use in a highway railroad crossing. The component comprises a flat pad of molded, comminuted rubber dimensioned to lie with companion pads inside and outside the rails and spiked to the ties. Pad bearing is provided against the webs of the rails, as well as against the tie plates and the ties. The result is a stabilized crossing easily installed and of long life.

6 Claims, 6 Drawing Figures

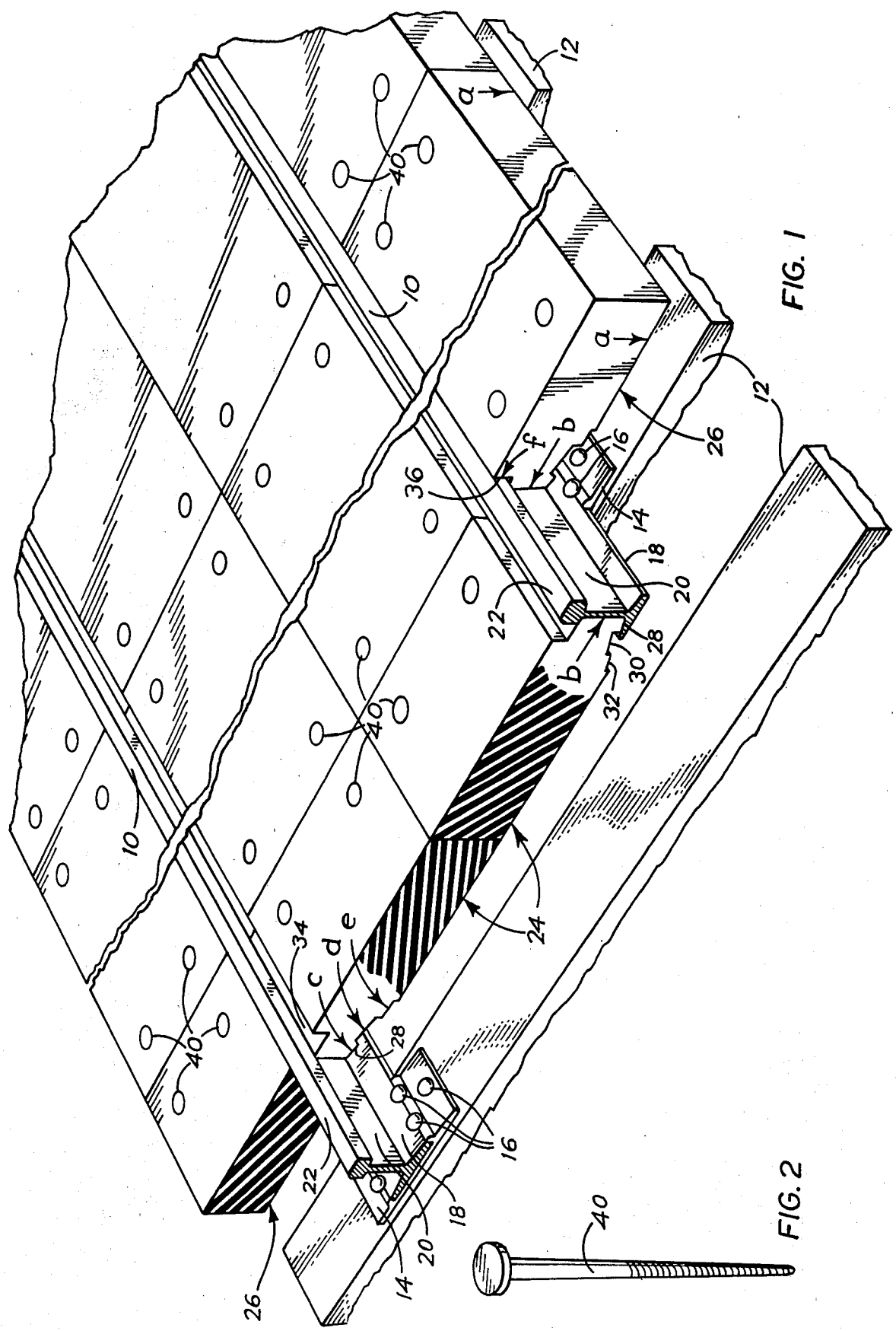

RAILROAD-HIGHWAY CROSSING DECK COMPONENT

BACKGROUND AND GENERAL STATEMENT OF THE INVENTION

This invention relates to highway railroad crossings. It pertains particularly to a stabilized, durable railroad crossing made of molded comminuted rubber particles.

Although the prior art crossings provide a variety of structural features, they are subject to various objections among the most important of which are the following: Many of them are complicated in construction. They are expensive to build, install and maintain. They are subject to "sanding action", i.e. the wear caused by sand and grit filtering into the interstices of the crossing structure and abrading contacting surfaces as the structure works and is displaced by passing traffic, both rail and highway.

They are unstable and tend to jar and vibrate loose in use with the result that the components shift position. They have a relatively short service life, because of the foregoing factors and also because the surface wears, becomes rough and is not easily repairable.

It is the general purpose of the present invention to provide a railroad crossing deck component which is simple in design, inexpensive to build, install and maintain, not subject to sanding action, stable, and possesses a long service life.

We have discovered that the foregoing and other objects, which will be developed hereinafter, may be achieved by the provision of a railroad crossing deck component which, in conjunction with other components of like kind may be assembled into a railroad crossing of solid, unitary, stable construction.

Each component broadly comprises a flat pad of molded, comminuted rubber. The pad is dimensioned to lie adjacent the rail with its undersurface supported on and bearing against the ties and ballast. Its upper surface lies at an elevation relative to the rail head predetermined to provide a smooth, traffic-crossing surface. The edge surface of the slab is contoured and dimensioned to bear against the web of one of the rails. The bottom surface parallel to the edge surface and immediately adjacent thereto, is contoured and dimensioned to provide an elongated foot adapted to bear against the adjacent rail base.

The bottom surface of the slab parallel and immediately adjacent to the foot is recessed to provide a channel having a ceiling adapted to bear against the tie plate-spike assembly which holds the rail plate. The upper surface is recessed to form a longitudinal edge recess providing in one case a flangeway and in another case a bearing surface which bears against the outside rail head edge. Spikes or other securing means secure the slab to the underlying ties to which it is in contact. The entire assembly thus is fixed and stabilized so that the components cannot work loose. It also is sealed against entry of abrasive grit and moisture.

THE DRAWINGS

In the drawings:

FIG. 1 is a fragmentary, foreshortened, top perspective view of a railroad crossing deck assembly including the deck component of our invention, partly in section;

FIG. 2 is an elevation of a lag screw employed in securing the deck component of our invention to the underlying railroad ties;

DESCRIPTION OF SPECIFIC EMBODIMENTS OF THE INVENTION

Figure 3:
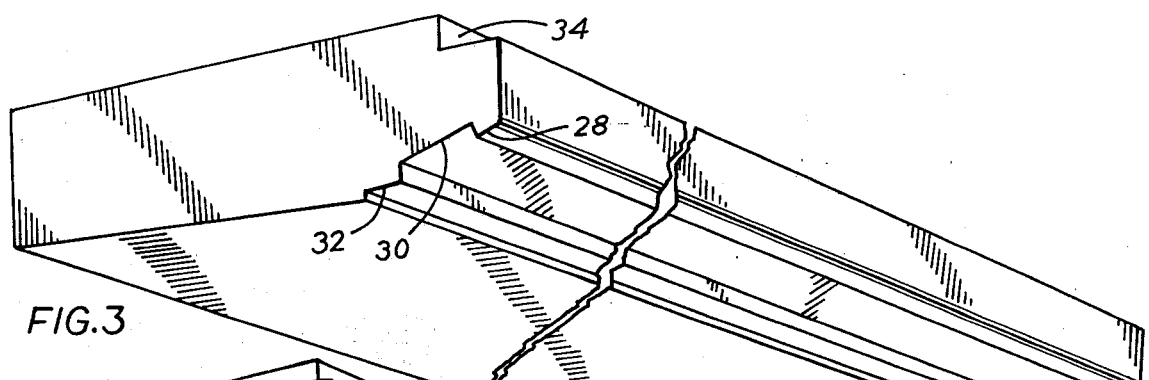
FIGS. 3 and 4 are foreshortened bottom perspective views of the railroad deck component of our invention in first and second embodiments.
Figure 4:
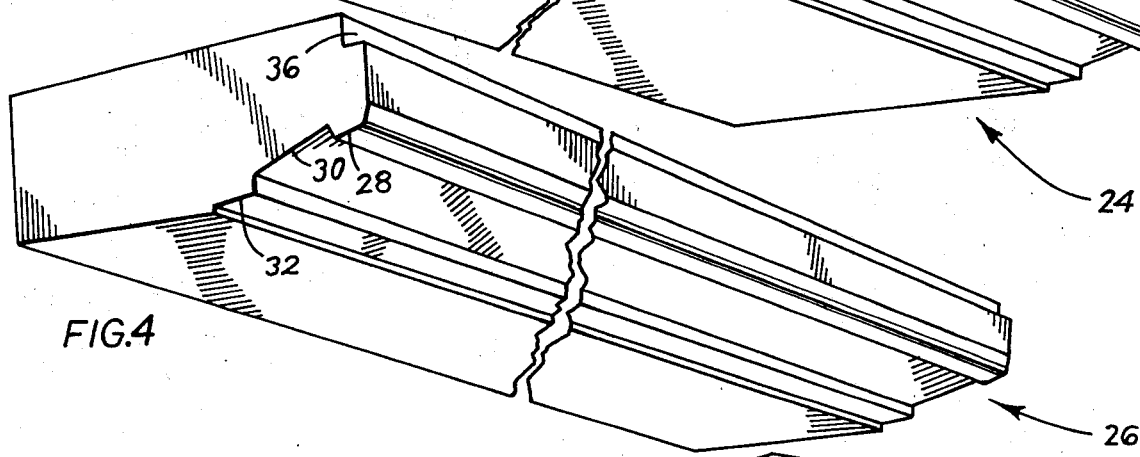
Figure 6:
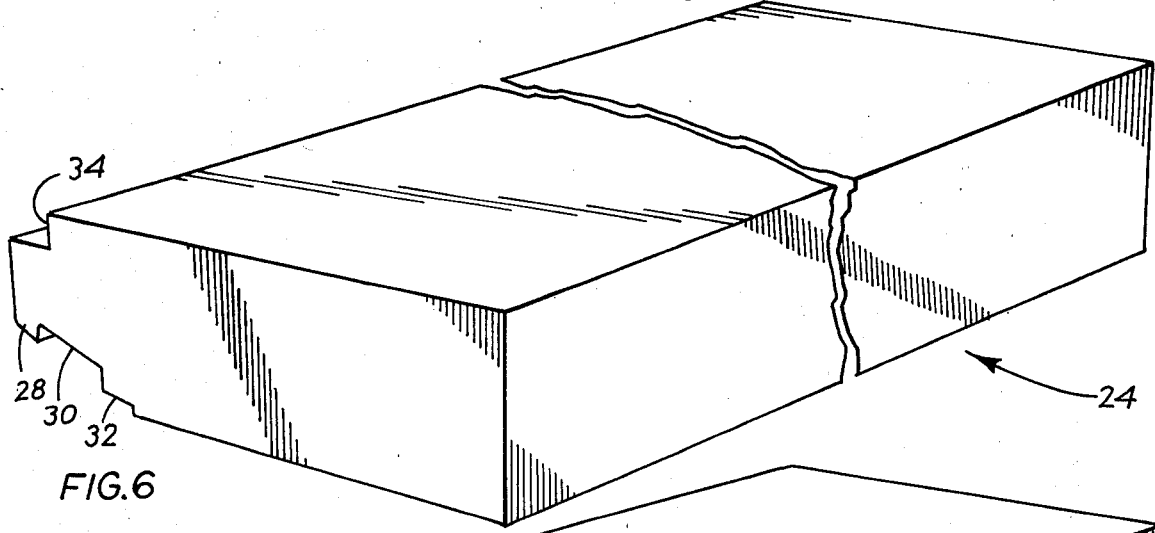
FIGS. 5 and 6 are foreshortened top perspective views of the embodiments of FIGS. 3 and 4, respectively.
Figure 5:
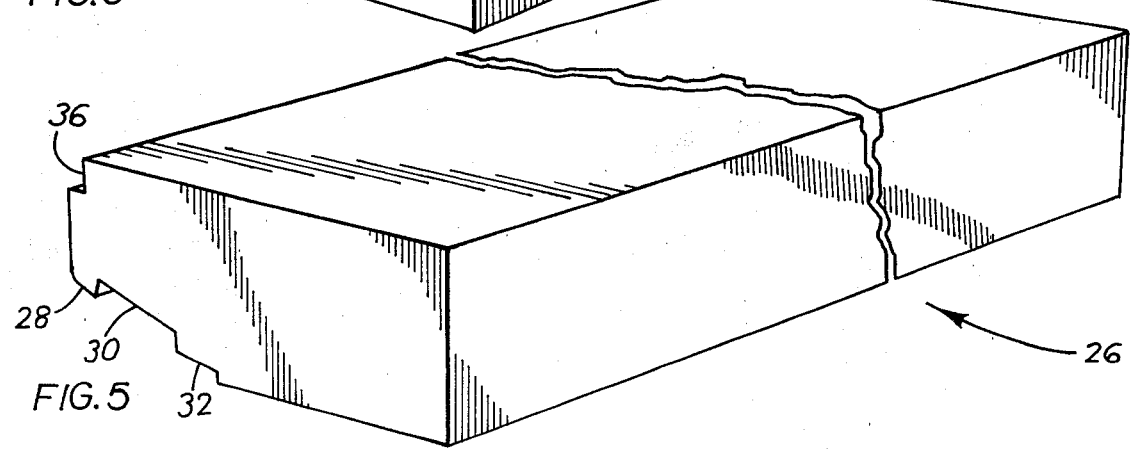

As illustrated in FIG. 1, the railroad crossing deck component of our invention is designed for use as a vehicle crossing over railroad tracks which intersect highways and roadways. The track assembly is conventional and includes a pair of spaced rails 10 supported on ties 12 and secured thereto by means of conventional tie plates 14 with spikes 16. Each rail comprises a horizontal base 18 and intermediate vertical web 20 and a rail head 22.

The crossing deck component of our invention comprises pads which fit inside and outside the rail to provide a smooth, uniform deck surface substantially coplanar with the upper surfaces of the rails, providing smooth passage for vehicles traversing the crossing.

The component pads of the deck are flexible, resilient, and fabricated from molded comminuted rubber. The raw material to be used for this purpose preferably is of the class described in our copending patent application Ser. No. 141,067, filed Feb. 5, 1981. It is prepared by reducing scrap rubber articles to small pieces. Such scrap rubber articles may comprise shoe soles, rollers, rubber mats, inner tubes, etc., but in particular comprise vehicle tires which are available in substantially unlimited quantity at very low cost.

Another primary source of raw material comprises the waste rubber byproduct from the tire retreading industry. In this industry it is conventional to buff off with grinding wheels the tread and undertread rubber from the tires to be recapped. This produces annually an enormous quantity of rubber particles ranging in size from dust to about $\frac{1}{4}''$. This waste product possesses a real disposal problem to the retread houses. However, it is ideal for use in the railroad crossing deck component of the present invention.

To fabricate the rubber pieces obtained from the above and other sources into the finished railroad crossing deck component, the raw material is charged into a mold of suitable contour having the desired deck component configuration. Within the mold, the pieces are first subjected to a preliminary consolidation to the desired density, e.g. a density of from 15–75 lbs. per cubic foot. The mold and contents then are placed in an oven and heated at a temperature of from 100–600, preferably 350°–450° F., while applying a pressure of from 500–4000, preferably 1000–3000 psi.

The mold and contents are heated at this temperature for a time sufficient to bring the central portion of the mold contents to a temperature of from 200°–300° F. Under these conditions the individual pieces within the mold consolidate and bond to each other, either by sintering together or through chemical reaction. This may be accomplished without the use of a solvent, binder, or vulcanizing agent.

At the conclusion of the heat and pressure treatment, the mold and contents are cooled, the mold opened and the finished deck component removed.

The deck components thus fabricated are of two general categories: The "inside-the-rail" component 24 and the "outside-the-rail" component 26.

Both categories comprise thick, long pads designed to fit snugly around the rails and to be secured in their located positions.

The pads have a thickness conforming to the rail height. This obviously may be varied to suit rails of varying height, by providing molds of corresponding depth.

The pads have lengths designed for convenience of installation and efficiency in use. They have widths such as to provide the desired transverse surface of the finished deck.

"Inside-the-rail" pads 24 may, if desired, be produced as a single pad installed by flexing the pad longitudinally in the middle and allowing it to drop in place. Whether formed as a single pad, or, as illustrated, a double pad, the "inside-the-rails" pads are dimensioned so that their side edges bear against the side faces of the rail webs in a press fit. The rail-side edges of the "outside-the-rail" pads 26 are also designed to fit snugly against the side faces of the rail webs.

As shown particularly in FIG. 1, the bottom surface parallel to the longitudinal edge surfaces and immediately adjacent thereto is contoured and dimensioned to provide an elongated foot 28 extending the length of the pad adapted to bear against the adjacent rail base.

The bottom surface parallel to and immediately adjacent the foot is recessed to provide a channel dimensioned and contoured to form a channel ceiling adapted to bear against the tie plate-spike assembly associated with the rail.

In the illustrated form of the invention this channel in cross section has a stepped contour to form two merging channels 30 and 32. Channel 30 is the deeper and provides a ceiling which bears against the heads of spikes 16. Channel 32 is shallower and provides a ceiling which bears against the upper surface of tie plates 14. This contoured structure is characteristic of the longitudinal side edges of both inside-the-rail pad 24 and outside-the-rail pad 26.

The two categories of pads differ, however, in the provision of channels or grooves adjacent the rails in their upper surfaces.

Inside-the-rail pad 24 has along its upper longitudinal surface parallel to and immediately adjacent the rail head a channel 34 of sufficient magnitude to accommodate the flanges of the railroad wheels rolling over the track.

Outside-the-track pads 26 have along their upper surfaces parallel to and immediately adjacent the rails longitudinal recesses 36. These are of relatively restricted width so that their side faces bear against the sides of rail heads 22.

Securing means are provided for securing the pads to the underlying ties. In the illustrated form of the invention the securing means comprise lag screws or spikes 40 of conventional design. These may be driven directly through the deck components into the underlying ties. Preferably the deck components may be drilled at the construction site, to conform to the tie location and the lag screws or spikes inserted through the resulting openings and driven into the ties.

The stability of the resulting crossing assembly is at once apparent. Spikes 40 secure the pads to the ties. In addition, uniform distribution of stress and insurance against shifting is assured by the provision of numerous bearing points of the deck components against the associated structure.

As shown in FIG. 1, the undersides of the pads bear against the ties, and associated tamped ballast as indicated by the arrow "a". They bear sideways against the side faces of rail webs 20 as indicated by the arrows "b".

Foot 28 bears against the upper surface of the inner segment of rail base 18, as shown by arrow "c". The ceilings of recesses 30 and 32 bear against the heads of spikes 16 and the upper surfaces of tie plates 14, respectively, as shown by arrows "d" and "e". The inner vertical side face of recess 36 of outside-the-rail pads 26 bear against the outer side faces of rail heads 22, as shown by arrows "f".

The assembly thus not only is prevented from shifting position; it is sealed against the access of grit and moisture and correspondingly increases the life of the crossing.

Other important advantages attend the use of the railroad crossing deck component of our invention.

The crossing assembly is uncomplicated in that it consists of only 2 categories of parts. It is inexpensive to build and install. It makes effective use of a waste product: scrap rubber.

It is sealed against access of sand and grit so that "sanding action" cannot occur as the rails move relative to the deck components and the deck components move relative to each other. Because of the stability of the installation, the securing means do not easily jar or work loose with passing rail or vehicle traffic.

If the surface becomes rough with wear, the pads may be easily removed, ground down, and resurfaced.

If desired, a non-skid tread may be molded into the upper surfaces of the pads. The density of the pads may be varied during molding to accommodate whatever load is to be applied to the crossing. The pads may be shaped with a band saw to fit any situation, for example, around switches. They can be drilled anywhere to suit existing tie structures.

The rubber of which the pad is composed has a memory, so that the pads return to their original shape after repeated loads have been applied, thereby preventing their permanent deformation in use. The assembly is proof against damage resulting from freezing and thawing.

All of these factors result in the provision of a railroad crossing structure of low cost and long life, i.e. a life of the order of 15 years as compared with a life of 18 months which is characteristic of a conventional wooden crossing.

Having thus described our invention in preferred embodiments, we claim:

1. For use in a highway railroad crossing including a pair of spaced rails, a plurality of rail-supporting ties, and a plurality of tie plates spiked to the ties and securing the rails thereto, each rail comprising a horizontal base, an intermediate vertical web, and a rail head; a deck component comprising:
   (a) a flat pad of molded, comminuted rubber, the pad being dimensioned to lie adjacent a rail with its undersurface supported on and bearing against the ties and its upper surface lying at an elevation, substantially parallel to tread surface of the rail head, to provide a smooth, traffic-crossing surface,
   (b) one lateral edge surface being contoured and dimensioned to form a foot and bear against substantially the entire web of each rail, (c) the undersurface perpendicular to said lateral edge surface and immediately adjacent thereto, said foot being contoured and dimensioned to provide an elongated surface adapted to bear against each adjacent rail base, (d) the undersurface parallel to and immediately adjacent each foot being recessed to provide a channel dimensioned and contoured to form a channel ceiling adapted to bear against the tie plate-spike assembly associated with the rail, thereby stabilizing the deck, (e) the upper surface perpendicular to and immediately adjacent said lateral edge surface being recessed to provide a channel dimensioned and contoured to receive the rail head, and when positioned between the rails to receive also wheel flanges, and (f) securing means for attaching the pad to the ties.

2. The deck component of claim 1 wherein the ceiling of the channel in the undersurface is shaped in a stepped contour to provide adjacent ceiling segments of different elevation, one adapted to be adjacent the spikes and one adjacent the tie plates.

3. The deck component of claim 1 wherein the deck component is adapted for use as an outside-the-rail deck component and the channel in the upper surface is dimensioned and contoured to provide a vertical surface adapted to bear against the rail head.

4. The deck component of claim 1 wherein the securing means for attaching the pad to the ties comprises spikes penetrating the pad and driven into the ties.

5. The deck component of claim 1 wherein the pad has two contoured edge surfaces and is dimensioned to extend between the rails in a press-fit.

6. The deck component of claim 1 wherein each pad has a single contoured surface and is dimensioned to cooperate with a companion pad arranged side by side to form a composite pad dimensioned to extend between the rails in a press-fit.

* * * * *